US012465263B2

(12) United States Patent
Ptaszek et al.

(10) Patent No.: US 12,465,263 B2
(45) Date of Patent: Nov. 11, 2025

(54) APPARATUS AND METHOD FOR DYNAMICALLY DETERMINING A LABEL FOR A CARDIAC POTENTIAL SIGNAL VIA SIMULATION OF NEURAL NETWORK TRAINED DATA

(71) Applicant: Anumana, Inc., Cambridge, MA (US)

(72) Inventors: Leon Ptaszek, Boston, MA (US); Rohit Jain, Danville, CA (US); Anand Ramani, Fresno, CA (US); Yogisha H J, Bengaluru (IN); Sanjeev Shrinivas Nadapurohit, Thane (IN); Karthik K. Bharadwaj, Bengaluru (IN); Shiva Verma, Bangalore (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 18/973,039

(22) Filed: Dec. 8, 2024

(65) Prior Publication Data

US 2025/0204833 A1 Jun. 26, 2025

Related U.S. Application Data

(60) Provisional application No. 63/614,867, filed on Dec. 26, 2023.

(51) Int. Cl.
*A61B 5/319* (2021.01)
*A61B 5/00* (2006.01)

(52) U.S. Cl.
CPC ............ *A61B 5/319* (2021.01); *A61B 5/7221* (2013.01); *A61B 5/7264* (2013.01)

(58) Field of Classification Search
CPC ...... A61B 5/319; A61B 5/7221; A61B 5/7264
See application file for complete search history.

(56) References Cited

U.S. PATENT DOCUMENTS

2019/0038163 A1* 2/2019 Moorman ............ A61B 5/7264

FOREIGN PATENT DOCUMENTS

| CN | 114041800 A | 2/2022 |
| CN | 114668401 A | 6/2022 |
| EP | 3488772 A1 | 5/2019 |
| WO | 2023101089 A1 | 6/2023 |

* cited by examiner

*Primary Examiner* — Serkan Akar
(74) *Attorney, Agent, or Firm* — Caldwell Intellectual Property Law

(57) ABSTRACT

An apparatus and method for determining a label dynamically using a potential signal. The apparatus includes a memory and at least a processor communicatively connected to the memory, wherein the memory contains instructions configuring the at least a processor to receive a user input comprising a labeled datum associated with the at least a potential signal, receive a plurality of stored data associated with the at least a potential signal, generate, using the at least a processor, a plurality of canonicalized data by processing the plurality of stored data, transmit, using a real time data simulator, the plurality of canonicalized data to a simulation module, generate, using the simulation module, a labeled prediction corresponding to a segmented datum.

14 Claims, 8 Drawing Sheets

APPARATUS AND METHOD FOR DYNAMICALLY DETERMINING A LABEL FOR A CARDIAC POTENTIAL SIGNAL VIA SIMULATION OF NEURAL NETWORK TRAINED DATA

CROSS-REFERENCE TO RELATED APPLICATIONS

This application claims the benefit of priority of U.S. Provisional Patent Application Ser. No. 63/614,867, filed on Dec. 26, 2023, and titled "SYSTEM AND METHOD FOR REAL-TIME SIMULATION FOR LABELLING OF CARDIAC SIGNALS," which is incorporated by reference herein in its entirety.

FIELD OF THE INVENTION

The present invention generally relates to the field of signal processing. In particular, the present invention is directed to an apparatus and a method for determining a label dynamically for a potential signal.

BACKGROUND

Cardiovascular disease is the most common cause of death worldwide. In recent years, there has been a surge in the burden of cardiovascular disease worldwide. Cardiac arrhythmias are responsible for a large proportion of the morbidity and mortality associated with cardiovascular disease. Ablation procedures have evolved to become an integral part of arrhythmia treatment. Ablation procedures are technically challenging and require that the operator successfully gather clinical data and use this data to make integrative assessments in real time to guide therapy. For example, creation of an electro-anatomical map of the chambers of the heart is often a key part of an ablation procedure. This map contains spatial information regarding the dimensions of the heart's chambers as well as electrical properties of the walls of the chambers (measured electrical properties are used to determine which areas of the heart's chambers are responsible for propagating the arrhythmia that requires treatment).

Accuracy of this spatial and electrical signal data can determine the success of an ablation procedure. In the case of an ablation for atrial fibrillation, there is a need to detect electrical signals in pulmonary veins and other portions of the atria, as these are common sources of abnormal electrical signals responsible for atrial fibrillation. Further, electrical signals of the pulmonary veins also referred to as "pulmonary vein potentials" are detected to indicate a presence of the abnormal electrical signals originating from the pulmonary veins.

SUMMARY OF THE DISCLOSURE

In an aspect, an apparatus for determining a label dynamically for a potential signal includes at least a processor and a memory communicatively connected to the at least a processor. The memory contains instructions configuring the processor to receive a user input comprising a labeled datum associated with the at least a potential signal, receive a plurality of stored data associated with the at least a potential signal, generate, using the at least a processor, a plurality of canonicalized data by processing the plurality of stored data, transmit, using a real time data simulator, the plurality of canonicalized data to a simulation module, generate, using the simulation module, a labeled prediction corresponding to a segmented datum of a plurality of segmented data, wherein generating the labeled prediction comprises receiving the plurality of canonicalized data from the real time data simulator, segmenting the plurality of canonicalized data, predicting a labeled prediction for each of the segmented datums, and generating a labeled prediction corresponding to the segmented datum.

In another aspect, a method for determining a label dynamically for a potential signal includes receiving a user input comprising a labeled datum associated with the at least a potential signal, receiving a plurality of stored data associated with the at least a potential signal, generating, using the at least a processor, a plurality of canonicalized data by processing the plurality of stored data, transmitting, using a real time data simulator, the plurality of canonicalized data to a simulation module, generating, using the simulation module, a labeled prediction corresponding to a segmented datum of a plurality of segmented data, wherein generating the labeled prediction comprises receiving the plurality of canonicalized data from the real time data simulator, segmenting the plurality of canonicalized data, predicting a labeled prediction for each of the segmented datums, and generating a labeled prediction corresponding to the segmented datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining a label dynamically for a potential signal. The apparatus includes at least a computing device comprised of a processor and a memory communicatively connected to the processor. The memory instructs the processor to receive a user input comprising a labeled datum associated with the at least a potential signal. The processor receives a plurality of stored data associated with the at least a potential signal. Additionally, the processor generates, using the at least a processor, a plurality of canonicalized data by processing the plurality of stored data. The processor transmits, using a real time data simulator, the plurality of canonicalized data to a simulation module. The processor generates, using the simulation module, a labeled prediction corresponding to a segmented datum of a plurality of segmented data wherein generating the labeled prediction comprises receiving the plurality of canonicalized data from the real time data simulator, segmenting the plurality of canonicalized data, predicting a labeled prediction for each of the segmented datums, and generating a labeled prediction corresponding to the segmented datum.

Figure 1:
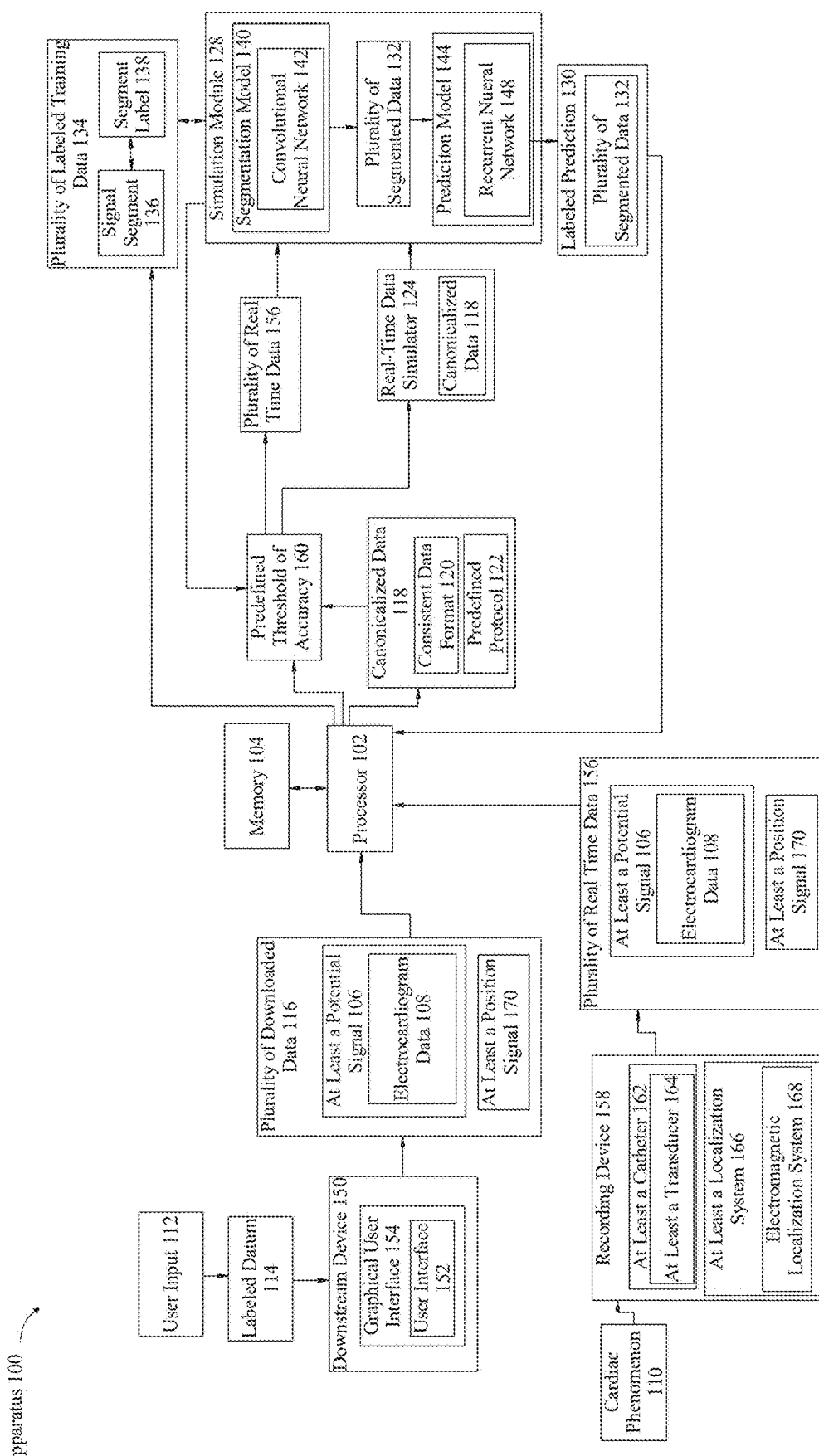
FIG. 1 is a block diagram of an apparatus for determining a label dynamically for a potential signal.

Referring now to FIG. 1, an exemplary embodiment of apparatus 100 for determining a label dynamically for a potential signal is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, segmentation model 140 may be configured to generate plurality of segmented data 132 as a function of the plurality of canonicalized data 118 and at least a temporal datum. As used in this disclosure, "segmented data" is a dataset that has been divided into distinct, meaningful parts or segments for more detailed analysis and processing. As used in this disclosure, a "temporal datum" is a piece of data that includes a timestamp or time-related information, indicating when an event occurred or a measurement was taken. In a non-limiting example, the plurality of segmented data 132 may include QRS Complex segments as P-wave segments. Continuing, without limitation, P-wave segments correspond to atrial depolarization, which may be identified by a small, upward deflection before the QRS complex.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 receives at least a potential signal 106 may include a plurality of electrocardiogram data 108. As used in this disclosure, a "potential signal" is the electrical signal generated and output by a transducer in response to detecting cardiac phenomenon 110 within the heart. As used in this disclosure, a "cardiac phenomenon" is any physiological or pathological event, activity, or condition related to the function or behavior of the heart that can be detected or measured. Cardiac phenomenon 110 includes but is not limited to electrical signals, mechanical movements, pressure changes, and biochemical processes occurring within the heart or its surrounding tissues. Cardiac phenomenon 110 are crucial indicators of heart health and function, and they provide valuable data for diagnosing, monitoring, and treating various cardiac conditions. In a non-limiting example, a cardiac phenomenon 110 may refer to the electrical activity associated with the heart's rhythm, such as the depolarization and repolarization of cardiac cells that create the P wave, QRS complex, and T wave observed in an electrocardiogram (ECG). Without limitation, the at least a potential signal may include electrocardiogram this disclosure, "electrocardiogramhy data" refers to the electrical recordings of the heart's activity over a period of time. For example, electrocardiogramay include electrocardiogram data. As used in the current disclosure, a "electrocardiogram data" is a signal representative of electrical activity of heart. Electrocardiogram data 108 may consist of several distinct waves and intervals, each representing a different phase of the cardiac cycle. These waves may include the P-wave, QRS complex, T wave, U wave, and the like. The P-wave may represent atrial depolarization (contraction) as the electrical impulse spreads through the atria. The QRS complex may represent ventricular depolarization (contraction) as the electrical impulse spreads through the ventricles. The QRS complex may include three waves: Q wave, R wave, and S wave. The T-wave may represent ventricular repolarization (recovery) as the ventricles prepare for the next contraction. The U-wave may sometimes be present after the T wave, it represents repolarization of the Purkinje fibers. The intervals between these waves may provide information about the duration and regularity of various phases of the cardiac cycle.

Still referring to FIG. 1, processor 102 receives user input 112, wherein user input 112 includes labeled datum 114 associated with at least a potential signal 106. As used in this disclosure, a "user input" is any data or information that a user provides to a system, application, or device. In a non-limiting example, user input 112 may include labeled datum 114. As used in this disclosure, a "labeled datum" is a piece of data that has an associated label providing additional context or meaning. In a non-limiting example, labeled datum 114 may include "Normal Sinus Rhythm," "Afib," "Premature Ventricular Contractions (PVC)," and the like. In a non-limiting example, user input 112 may be used to train simulation module 128 as discussed in more detail below.

Still referring to FIG. 1, processor 102 receives plurality of stored data 116 associated with at least a potential signal 106. As used in this disclosure, "stored data" any information that is saved and retained in a storage medium. Without limitation the storage medium containing the stored data may include a user's computer's hard drive, solid-state drive, cloud storage, or any other data storage device. In a non-limiting example, stored data may include downloaded data. As used in this disclosure, "downloaded data" is any digital information that has been transferred from a remote server or online source to a local device or storage medium. In a non-limiting example, stored data 116 may correspond to at least a potential signal, such as an echocardiogram (ECG) signal. Without limitation, stored data 116 may be downloaded from a storage system, such as Amazon Web Services cloud-S3.

Still referring to FIG. 1, processor 102 generates a plurality of canonicalized data 118 by processing plurality of stored data 116. As used in this disclosure, "canonicalized data" is data that has been transformed into a standard, consistent, and normalized format. In a non-limiting example, canonicalized data 118 may include converting raw ECG data into a normalized consistent format. Without limitation, generating the canonicalized data may include normalizing stored data 116 into a consistent data format 120 and validating stored data 116 against a predefined protocol. As used in this disclosure, a "consistent format" is a standardized way of presenting and organizing data or information such that it adheres to a specific set of rules or guidelines In a non-limiting example, stored data 116 may be raw ECG data which may include a plurality of data points corresponding to a timestamp "2024 Jul. 18 10:00:00" and a voltage "0.89 mV." Continuing, stored data 116 may be canonicalized by converting all timestamps to a common time zone, such as coordinate universal time (UTC) and a consistent format, for example, ISO 8601. As used in this disclosure, "ISO 8601" is an international standard for date and time representations issued by the International Organization for Standardization (ISO). For example, without limitation, an ISO 8601 format for time may include a basic format "hhmmss, i.e., 135730 for 1:57:30 PM" ad/or it may include extended format "hh:mm, i.e., 13:57:30 for 1:57:30 PM."

Additionally and or alternatively, a low-pass filter to remove high-frequency noise from the voltage readings may be applied to canonicalize stored data 116. For example, a low pass filter applied to ECG data may provide isolation of relevant signals, such as the heartbeats, from unwanted noise. Without limitation, by applying a low-pass filter, stored data 116 may be cleaned and made more reliable for further analysis. Continuing, this preprocessing step ensures that the subsequent analyses are based on accurate and clean data, thus may improve the validity of the results.

In another non-limiting example, stored data 116 may be resampled to a consistent time interval. For example, without limitation, stored data 116 may be sampled every second or every 0.5 of a second. In another non-limiting example, the voltage readings may be set to a standard scale, such as 0 to 1 or −1 to 1. Without limitation resampling may help in standardizing the data points, making them uniformly spaced over time. Continuing, resampling may be useful when processing at least a potential signal 106 collected at irregular intervals and may help ensure that all data points are aligned and comparable.

In another non-limiting example, canonicalizing stored data 116 may include identifying and removing outlier data points that deviate significantly from the expected range. For example, outliers in ECG data may result from various sources, such as sensor malfunctions or sudden movements by the subject. Identifying and removing these outliers is crucial for ensuring the accuracy and reliability of the data. Continuing, this process may involve utilizing statistical techniques, like Z-score analysis, and interquartile range method (IQR), and the like, to detect abnormal values and either correct or discard them. Without limitation, Z-score analysis is a statistical technique that measures the number of standard deviations a data point is from the mean of the dataset. Without limitation, IQR is based on the spread of the middle 50% of the data and determining upper and lower bounds to filter data through. Detecting outliers may be essential for maintaining the integrity of the dataset and ensuring that the conclusions drawn from the signal analysis are accurate and reliable.

As used in this disclosure, a "predefined protocol" is a specific value or set of criteria established in advance, used to make decisions or trigger actions. In a non-limiting example, the predefined protocol 122 may provide specific steps for the canonicalize process, such as, first filter stored data 116, then normalize the data. In another non-limiting example, the predefined protocol 122 may instruct the system to first apply a bandpass filter to stored data 116. Without limitation, the bandpass filter may allow frequencies within a certain range to pass through while attenuating frequencies outside that range. Continuing, this is particularly useful for ECG data, where the focus is on the heartbeats which occur within a specific frequency band. For example, without limitation, a bandpass filter might be set to allow frequencies between 0.5 Hz and 50 Hz, which are typical for ECG signals.

In another non-limiting example, the predefined protocol 122 may include a step to remove baseline wander from stored data 116. Baseline wander is a low-frequency noise often caused by breathing or movement, which can distort the ECG signal. The protocol might specify the use of a high-pass filter with a cutoff frequency of around 0.5 Hz to remove this type of noise while preserving the integrity of the actual heart signals.

In another non-limiting example, the predefined protocol 122 may instruct apparatus to apply a wavelet transform for denoising stored data 116. Without limitation, wavelet transform is a technique that decomposes the signal into different frequency components, allowing for the selective removal of noise while retaining important features of the signal. For example, without limitation, the protocol may specify the use of discrete wavelet transform (DWT) to identify and suppress noise components in the ECG signal.

In another non-limiting example, the predefined protocol 122 may instruct the system to use adaptive filtering techniques to reduce noise in stored data 116. Without limitation, adaptive filters may adjust their parameters in real-time to minimize the difference between the desired signal and the actual signal. Continuing, this is useful in scenarios where the noise characteristics are changing over time. For instance, without limitation, an adaptive noise canceler may be employed to reduce interference from other electronic devices while recording the ECG signal.

In another non-limiting example, the predefined protocol 122 may specify methods for identifying and removing artifacts from stored data 116. Without limitation, artifacts are distortions or anomalies in the signal caused by external factors, such as muscle contractions or electrode movements. Without limitation, the protocol may include techniques such as independent component analysis (ICA) to separate and remove these artifacts from the ECG signal, ensuring that the final data used for analysis is clean and accurate.

Still referring to FIG. 1, apparatus 100 transmits, using real time data simulator 124, the plurality of canonicalized data to simulation module 128. As used in this disclosure, a "real time data simulator" is a system or software application designed to generate and transmit data streams that closely mimic real-world conditions and scenarios in real-time. In a non-limiting example, the real time data simulator 124 may provide a controlled and repeatable environment for testing, validation, and analysis of systems that rely on real-time data inputs. For instance, without limitation, the real-time data simulator may feed ECG data streams that mimic various cardiac conditions, such as normal sinus rhythm, atrial fibrillation, and ventricular tachycardia to the simulator module. By providing these realistic data streams, the simulator allows developers to test their algorithms under controlled yet realistic conditions. This controlled environment ensures that the algorithms can accurately detect and classify different cardiac events before they are deployed in clinical settings. The repeatability of the simulator's data streams also allows for rigorous validation, ensuring that the algorithms perform consistently across multiple tests.

Still referring to FIG. 1, apparatus 100 generates, using simulation module 128, a labeled prediction 130 corresponding to segmented datum of the plurality of segmented data 132 wherein generating the labeled prediction includes receiving the plurality of canonicalized data 118 from real time data simulator 124, segmenting the plurality of canonicalized data, predicting labeled prediction 130 for each of segmented datums, and generating labeled prediction 130 corresponding to segmented datum.

As used in this disclosure, a "simulation module" is a software component or a self-contained program designed to enhance the accuracy and efficiency of labelling potential signals. In a non-limiting example, simulation module 128 may receive as input the canonicalized data 118 and output a labeled prediction 130. As used in this disclosure, a "labeled prediction" is simulation module 128 outcome associated with a specific label or category associated with a segmented datum. In a non-limiting example, a labeled prediction 130 may include "Normal Sinus Rhythm" to describe regular P-wave, QRS complex, and T-wave occurring at normal intervals. As used in this disclosure, a "segmented datum" is a piece of time-series data that has been divided into meaningful, distinct time periods or segments. In a non-limiting example, the segmented datum may be of various increments and durations. For example, the segmented datum may be at timestamp, t=400 ms to t=550 ms. In a non-limiting example, the segmented datum may be determined by two distinct time stamps and/or a first timestamp and a time duration. In a non-limiting example simulation module 128 may be used for real-time labelling of cardiac signals. In a non-limiting example, simulation module 128 may be used for label prediction on stored data 116.

With continued reference to FIG. 1, simulation module 128 may be trained using a plurality of labeled training data 134 which includes signal segment 136 corresponding to a segment label 138. As used in this disclosure, "labeled training data" is a dataset used in supervised machine learning that consists of input data paired with the correct output labels. In a non-limiting example, the input data may include a plurality of signal segment 136, where each signal segment 136 is associated with a segment label 138 of a plurality of segment label 138. As used in this disclosure, a "signal segment" is a distinct, contiguous time-dependent portion of a signal that has been isolated for analysis, processing, or interpretation. As used in this disclosure, a "segment label" is an annotation, a tag, or identifier assigned to a specific part or segment of stored data 116 to categorize or describe its characteristics. For example, signal segment 136 t=20 ms to t=46 ms may have segment label 138 "AFib" to identify a cardiac signal with an absence of distinct P-waves, irregularly irregular QRS complexes. Additionally and or alternatively, signal segment 136 t=47 ms to t=73 ms may be labeled "Normal Sinus Rhythm," indicating a regular sequence of P-waves, QRS complexes, and T-waves occurring at expected intervals. In another non-limiting example, labeled training data 134 may include signal segment 136 from t=74 ms to t=100 ms with the segment label 138 of "PVC" (Premature Ventricular Contraction) may indicate a premature, wide QRS complex without a preceding P-wave. In another non-limiting example, labeled training data 134 may include signal segment 136 of t=101 ms to t=127 ms with a segment label 138 of "STEMI" (ST-Elevation Myocardial Infarction), distinguished by an elevated ST segment above the baseline, signaling a potential acute myocardial infarction. In another non-limiting example, labeled training data 134 may include signal segment 136 from t=128 ms to t=154 ms with the segment label 138 of "Bradycardia," which shows a slower-than-normal heart rate, typically less than 60 beats per minute, with otherwise normal waveform patterns. In another non-limiting example, labeled training data 134 may include the segment from t=155 ms to t=181 ms with the segment label 138 of "Tachycardia," indicating a faster-than-normal heart rate, over 100 beats per minute, while maintaining normal waveform morphology. In another non-limiting example, labeled training data 134 may include signal label as "Artifact" to denote portions of the signal that are affected by external noise or movement, and thus not useful for diagnostic purposes. For instance, the signal segment 136 of t=182 ms to t=208 ms may include segment label 138 of "Artifact" due to high-frequency noise superimposed on the cardiac signal.

With continued reference to FIG. 1, the plurality of labeled training data 134 may be produced through data collection, preprocessing, manual annotation, automated processes, any combination thereof, and the like. For example, cardiologists and trained medical professionals may manually review ECG signals and annotate different segments based on their expertise. Continuing, the cardiologists and trained medical professionals may label segments as "AFib," "Normal Sinus Rhythm," "PVC," "STEMI," etc., by visually inspecting the patterns in the ECG data. Continuing, these annotations may serve as training data for machine learning models. For instance, without limitation, a cardiologist may identify and label the signal segment 136 from t=1000 ms to t=1046 ms as "AFib" due to the absence of distinct P-waves and the presence of irregularly irregular QRS complexes. With continued reference to FIG. 1, in a non-limiting example, the labeled training data may be produced by a may be consistent with one or more aspects of the prediction generator described in U.S. patent application Ser. No. 18/973,037, filed on Dec. 8, 2024, titled "APPARATUS AND METHOD FOR VALIDATING, USING USER INPUT, LABELED DATA GENERATED BY A PREDICTION GENERATOR," which is incorporated by reference herein in its entirety.

With continued reference to FIG. 1, simulation module 128 may generate synthetic data to create a diverse plurality of labeled training data 134. For example, without limitation synthetic ECG data may be generated using mathematical models and simulations to create a diverse training dataset. Continuing, this data may include controlled variations in heart rate, rhythm, and other cardiac features, providing a rich set of examples for training. For instance, without limitation, synthetic data may be generated to include rare cardiac events, ensuring the simulation model is exposed to a wide range of conditions.

With continued reference to FIG. 1, simulation module 128 may include segmentation model 140 which may include convolutional neural network 142 and prediction model 144 comprising recurrent neural network 148. As used in this disclosure, a "segmentation model" is an algorithm designed to partition data into distinct, meaningful segments based on specific criteria. In a non-limiting example, the segmentation model may identify and segment different phases of an ECG signal, such as the P-wave, QRS complex, and T-wave, from raw input data and/or canonicalized data 118. As used in this disclosure, a "convolutional neural network (CNN)" is a type of deep learning algorithm that is particularly effective for analyzing visual data. In a non-limiting example, the CNN 142 may capture spatial hierarchies in the canonicalized data 118. Continuing, the CNN 142 may recognize signal features regardless of feature location within the canonicalized data 118. Continuing, this is useful for segmenting signals where the relevant features may occur at regular or irregular intervals. As used in this disclosure, a "prediction model" is an algorithm designed to forecast future outcomes or trends based on historical data and input variables. In a non-limiting example, the prediction model 144 may include a recurrent neural network 148. As used in this disclosure, a "recurrent neural network (recurrent neural network)" is a type of artificial neural network designed for processing sequences of data. In a non-limiting example, the recurrent neural network 148 may be designed to handle sequential data and can maintain context over time such as prediction labels for signal segment 136 of time-series data. In another non-limiting example, the recurrent neural network 148 may capture and utilize information from previous time signal segment 136 to understand the context of the signal and make the labeled prediction 130 based on the preceding segments. In a non-limiting example, the recurrent neural network 148 may predict labels or annotations for the signal segment 136. These labels indicate the type of cardiac event or condition detected in each segment. For example, after the CNN 142 segments the ECG data, the recurrent neural network 148 could analyze the sequence of these segments and predict labels such as "Normal Sinus Rhythm," "AFib," or "PVC" based on the identified patterns.

With continued reference to FIG. 1, the prediction model 144 may be configured to generate a labeled prediction 130 corresponding to each segmented datum of the plurality of segmented data 132. In a non-limiting example, segmentation model 140 may generate plurality of segmented data 132 such as P-wave segments. Continuing, without limitation, P-wave segments correspond to atrial depolarization, identified by a small, upward deflection before the QRS complex. Continuing, the temporal datum for these segments may include timestamps indicating the start and end of each P-wave, such as "Segment 1: t=0 ms to t=80 ms." Continuing, the prediction model 144 may generate the labeled prediction 130 of "Label: P-Wave."

Additionally, segmentation model 140 may generate QRS complex segments representing ventricular depolarization, characterized by a sharp, rapid rise and fall in the ECG waveform. Continuing, these segments may be labeled with timestamps marking the duration of the QRS complex, for example, "Segment 2: t=81 ms to t=120 ms." Continuing, the prediction model 144 may generate the labeled prediction 130 of "Label: QRS Complex." In another non-limiting example, T-wave segments associated with ventricular repolarization may be generated, generally seen as a modest upward deflection following the QRS complex. The temporal datum for these segments might indicate the timing of each T-wave, such as "Segment 3: t=121 ms to t=160 ms." Continuing, the prediction model 144 may generate the labeled prediction 130 of "Label: T-Wave."

In another non-limiting example, segmentation model 140 may also generate ST-segment data, representing the interval between the end of the QRS complex and the start of the T-wave, used to assess conditions such as myocardial ischemia. The temporal datum for these segments may show the start and end of the ST-segment, for instance, "Segment 4: t=121 ms to t=140 ms." Continuing, the prediction model 144 may generate the labeled prediction 130 of "Label: ST-Segment."

In another non-limiting example, the RR intervals, which represent the time between two successive R-waves may be used to detect rhythm irregularities, and may be segmented and labeled with corresponding timestamps, such as "Segment 5: t=0 ms to t=200 ms." Continuing, the prediction model 144 may generate the labeled prediction 130 of "Label: RR Interval."

Without limitation, segmentation model 140 may identify and label artifact segments that contain noise or artifacts, such as those caused by patient movement or electrode displacement, which may need to be excluded from analysis. For instance, without limitation, the temporal datum for these segments may indicate when the artifact occurred, like "Segment 6: t=161 ms to t=200 ms." Continuing, the prediction model 144 may generate the labeled prediction 130 of "Label: Artifact." In another non-limiting example, simulation module 128 may generate baseline drift segments where the ECG baseline is unstable or drifting, often caused by respiration or movement. These segments could be labeled with timestamps indicating the period of baseline drift, for example, "Segment 7: t=201 ms to t=240 ms." Continuing, the prediction model 144 may generate the labeled prediction 130 of "Label: Baseline Drift." Additionally and or alternatively, arrhythmic event segments indicating abnormal heart rhythms, such as atrial fibrillation or ventricular tachycardia, may be labeled with timestamps marking the occurrence of the arrhythmia, like "Segment 8: t=241 ms to t=300 ms." Continuing, the prediction model 144 may generate the labeled prediction 130 of "Label: AFib."

With continued reference to FIG. 1, downstream device 150 may be configured to display the labeled prediction 130 through user interface 152 of graphical user interface 154. As used in this disclosure, a "downstream device" is an electronic device that presents information to the entity. In some cases, downstream device 150 may be configured to project or show visual content generated by computers, video devices, or other electronic mechanisms. In some cases, downstream device 150 may include a liquid crystal display (LCD), a cathode ray tube (CRT), a plasma display, a light emitting diode (LED) display, and any combinations thereof. In a non-limiting example, one or more downstream device 150 may vary in size, resolution, technology, and functionality. Downstream device 150 may be able to show any data elements and/or visual elements as listed above in various formats such as, textural, graphical, video among others, in either monochrome or color. Downstream device 150 may include, but is not limited to, a smartphone, tablet, laptop, monitor, tablet, and the like. Downstream device 150 may include a separate device that includes a transparent screen configured to display computer generated images and/or information. In some cases, downstream device 150 may be configured to present a graphical user interface (GUI) to a user, wherein a user may interact with a GUI. In some cases, a user may view a GUI through downstream device 150. Additionally, or alternatively, processor 102 be connected to downstream device 150. In one or more embodiments, transmitting the labeled prediction 130 may include displaying the labeled prediction 130 at downstream device 150 using a visual interface. As used in this disclosure, a "graphical user interface" is a graphical form of user interface 152 that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface 154. For example, links to decentralized platforms as described in this disclosure may be incorporated using icons. Using an icon may be a fast way to open documents, run programs etc. because clicking on them yields instant access. As used in this disclosure, a "user interface" is a digital display that presents information, options, interactive elements to users in an intuitive and visually appealing manner. In some embodiments, user interface 152 may include at least an interface element. As used in this disclosure, "at least an interface element" is a portion of user interface 152. In a non-limiting example, at least an interface element may include, without limitation, a button, a link, a checkbox, a text entry box and/or window, a drop-down list, a slider, or any other interface element that may occur to a person skilled in the art upon reviewing the entirety of this disclosure. In some embodiments, at least an interface element may include an event handler.

Still referring to FIG. 1, the simulation module may be configured to conditionally receive a plurality of real time data 156 from a recording device 158 when the simulation module 128 meets a predefined threshold of accuracy 160. As used in this disclosure, a "recording device" is an apparatus or system that captures data or signals. As used in this disclosure, a "predefined threshold of accuracy" is a specified level of precision or correctness that data or a process must meet to be considered valid or acceptable. In a non-limiting example, recording device 158 may include at least a catheter 162 configured for intracardiac use. In the at least a at least a catheter 162 may include at least a transducer 164 configured to detect at least a cardiac phenomenon 110 and output at least a potential signal 106, as a function of cardiac phenomenon 110. As used in this disclosure, a "catheter" is a flexible tube inserted into the body to perform various medical procedures. In a non-limiting example, at least a catheter 162 may record and map at least a beat of a cardiac phenomenon 110 and output at least a visual element. In a non-limiting example, at least a catheter 162 may be used to facilitate the detection and mapping of cardiac activity, providing essential data for apparatus 100 to process and analyze. In a non-limiting example, at least a catheter 162 may be used in procedures such as cardiac ablation or electrophysiological studies to gather detailed information about heart rhythms. Transducer 164 in at least a catheter 162 may detect these electrical signals and output potential signals corresponding to these cardiac events, enabling real-time monitoring of heart rhythms and the identification of arrhythmias or other electrical abnormalities.

As used in this disclosure, a "transducer" is a device designed to convert one form of energy into another. In a non-limiting example, transducer 164 may facilitate the measurement, monitoring, and control of various physical quantities. Without limitation, this energy conversion capability may enable transducers to be used for various applications. For instance, without limitation, transducers may be used in ultrasound equipment to transform electrical energy into sound waves and vice versa, creating images of internal body structures. When a transducer converts a quantity of energy to an electrical voltage or an electrical current it is called a sensor. A measurable quantity of energy may include sound pressure, optical intensity, magnetic field intensity, thermal pressure, etc. When a transducer converts an electrical signal into another form of energy such as sound, light, mechanical movement, it is called an actuator. It should be noted that sound is incidentally a pressure field. Actuators allow the use of feedback at the source of the measurements. In a non-limiting embodiment, a transducer may detect at least a cardiac phenomenon 110 and output potential signal. In another non-limiting example, a transducer may include a plurality of clinical transducers. As used in this disclosure, a "plurality of clinical transducers" is a transducer device used in the medical field to measure, analyze, and/or quantify electrical signals in a body. The potential signal may be indicative of the heart's electrical activity, which may be used for diagnostic or monitoring purposes. The potential signal may represent variations in electrical potential that occur as the heart undergoes its rhythmic contractions and relaxations, providing valuable data on the cardiac cycle and function. In a non-limiting example, the potential signal may be generated by a transducer embedded in at least a catheter 162 during an electrophysiological study. When at least a catheter 162 is positioned intracardially, transducer 164 may detect electrical impulses corresponding to the depolarization and repolarization phases of the cardiac cycle. The output potential signal may then be transmitted to an external monitoring system where it is displayed as an electrocardiogram (ECG) tracing. Continuing, the tracing may allow cardiologists to analyze the electrical activity and identify abnormalities such as arrhythmias or conduction blockages. In another non-limiting example, the potential signal may be used in a real-time cardiac monitoring system during a surgical procedure. Continuing, as at least a catheter 162 transducer may detect changes in intracardiac electrical activity, the potential signal is continuously sent to a monitoring device. Without limitation, surgeons may use this real-time data to make informed decisions about interventions, ensuring that the heart remains stable and functions properly throughout given procedure. Without limitation, the aforementioned application highlights the versatility of potential signals in providing critical, time-sensitive information in various medical contexts.

In another non-limiting example, cardiac phenomenon 110 may include the mechanical contraction and relaxation of the heart muscle, such as the pressure changes during the systolic and diastolic phases of the cardiac cycle. Transducer 164 may detect variations in intracardiac pressure and generate signals that reflect these pressure changes. This data may be used to assess cardiac output, diagnose conditions like heart failure or valvular heart disease, and guide therapeutic interventions by providing detailed insights into the heart's mechanical function.

This may include, without limitation, various types of signal data, such as analog signals, digital signals, time-series signal data, spatial signals, frequency signals, multi-dimensional signals, and the like. In a non-limiting example, an analog signal is any continuous-time signal representing some other quantity, i.e., analogous to another quantity. For example, and without limitation, in an analog audio signal, the instantaneous signal voltage varies continuously with the pressure of the sound waves. Typically, analog signal refers to electrical signals; however, mechanical, pneumatic, hydraulic, and other systems may also convey or be considered analog signals. In another non-limiting example, a digital signal is a signal that represents data as a sequence of discrete values; at any given time it can only take on, at most, one of a finite number of values. In some cases, digital signals may represent information in discrete bands of analog levels, wherein all levels within a band of values represent the same information state. In a non-limiting example, a digital signal may be represented as a digital circuit. Typically, digital circuit signals can have two possible valid values; a binary signal or logic signal wherein the binary signal and the logic signal are represented by two voltage bands: one voltage band that is near a reference value, and the other voltage value that is near the supply voltage. The voltage bands correspond to the two values "zero" and "one" (or "false" and "true") of the Boolean domain, wherein at any given time, a binary signal represents one binary digit (bit). Without limitation, digital signals are generally used for communications and processing within electronic devices and computer systems. In another non-limiting example, time-series signal data is information in the form of a signal that is collected and recorded over consistent intervals of time. Without limitation, time-series signal data may be used in order to extract meaningful statistics and other characteristics of the data. Time-series signal data can be classified into two main types: continuous-time series signals and discrete-time signals. Continuous-time signals are signals that are measured and recorded over a continuous range, including, but not limited to, analog signals, such as sound waves and temperature measurements (from analog devices like analog thermometers). On the other hand, discrete-time signals are recorded at specific, distinct points. For example, and without limitation, discrete-time signals may include digital sensor measurements and financial market data sampled at fixed intervals. In another non-limiting example, potential signal 106 may include an electrocardiogram signal wherein the electrocardiogram signal may include an electrocardiogram datum. As used herein, an "electrocardiogram datum" is a single data point obtained from the electrical activity of the heart of a patient. An electrocardiogram datum may be derived from an electrocardiogram signal. In some embodiments, an electrocardiogram datum may include a rhythm strip electrocardiogram datum. As used herein, a "rhythm strip electrocardiogram datum" is a datum describing electrical activity detected using a single electrode. In some embodiments, an electrocardiogram datum may include a median beat electrocardiogram datum. As used herein, a "median beat electrocardiogram datum" is a datum describing electrical activity detected using a plurality of leads and/or electrodes. In some embodiments, an electrocardiogram datum may include data collected by 2, 3, 4, 5, 6, 7, 8, 9, 10, 11, 12, or more electrocardiogram leads. For example, an electrocardiogram datum may include a median beat collected by 12 electrocardiogram leads. A "lead," as used in this disclosure, is one or more electrodes attached to the skin to detect a heart's electric signals. As used in this disclosure, a "standard 12-lead electrocardiogram signal" is a measurement the electrical activity of a heart from 12 different perspectives. In a non-limiting embodiment a standard 12-lead electrocardiogram signal may include a graphical record of the direction and magnitude of the electrical activity generated by the depolarization and repolarization of the atria and ventricles of the heart. As used in this disclosure, an "electroanatomic map" is a detailed, three-dimensional representation of the electrical activity and anatomical structure of the heart. In a non-limiting example, the electroanatomic map may be created using data collected from a catheter that records and maps cardiac phenomena. In another non-limiting example, the electroanatomic map provide a visual depiction of the heart's electrical impulses and physical form, enabling precise identification and analysis of areas that may be causing abnormal heart rhythms or other cardiac issues. The electroanatomic map integrates both the electrical signals and the spatial geometry of the heart, offering a comprehensive tool for diagnosis and treatment planning. In a non-limiting example, an electroanatomic map may be created during an electrophysiological study where a catheter is navigated through the heart to record electrical activity. The data collected from various points within the heart is used to construct a three-dimensional map that highlights regions of interest, such as areas with abnormal electrical pathways or scar tissue. This map can be displayed on a monitor, providing clinicians with a visual guide to target specific areas for ablation therapy, thereby improving the precision and effectiveness of the treatment. In another non-limiting example, the electroanatomic map may be employed during a cardiac procedure to continuously update the map in real-time as at least a catheter 162 moves within the heart. This dynamic mapping allows for immediate adjustments based on the current electrical activity and anatomical changes observed during the procedure. Such real-time updates may be particularly useful in complex cases where the anatomy and electrical activity of the heart vary significantly from patient to patient, ensuring that the intervention is tailored to the individual's specific cardiac structure and function.

Still referring to FIG. 1, apparatus 100 may conditionally use at least a localization system 166 configured to detect at least a position signal 170 as a function of a location of the at least a catheter 162. As used in this disclosure, a "localization system" is a specialized apparatus designed to detect and determine the position of a catheter within a body or environment by utilizing position signal 170. These signals are a function of at least a catheter 162 location, enabling precise tracking and navigation during medical procedures. In a non-limiting example, the purpose of at least a localization system 166 is to enhance the safety and efficacy of catheter-based interventions by providing critical spatial information. As used in this disclosure, a "position signal" is a signal generated by localization system 166 to determine the location of a catheter within the body. With continued reference to FIG. 1, in a non-limiting example, localization system 166 may be consistent with one or more aspects of the localization system described in U.S. patent application Ser. No. 18/764,853, filed on Jul. 5, 2024, titled "SYSTEM AND METHOD FOR LOCATING A MEDICAL DEVICE USING AN ELECTRICAL FIELD CREATION," which is incorporated by reference herein in its entirety.

With continued reference to FIG. 1, at least a localization system 166 may include an electromagnetic localization system 168. Additionally and or alternatively, at least a localization system 166 may include an ultrasound-based localization system, an optical localization system, and an impedance-based localization system. As used in this disclosure, an "electromagnetic localization system" is a type of localization technology that uses electromagnetic fields to determine the precise position and orientation of objects within a given space. This system typically involves generating a low-frequency electromagnetic field in the area of interest, and then tracking the position of sensors or coils that respond to this field. The sensors may be integrated into catheters or other medical instruments, allowing for accurate real-time tracking of their location and movement within the body. In the context of electroanatomic mapping, the electromagnetic localization system enables the precise localization of at least a catheter 162 tip within the heart. This is achieved by placing electromagnetic field generators around the patient and using sensors on at least a catheter 162 to detect the field. The system calculates the exact position and orientation of at least a catheter 162 by measuring the electromagnetic field's strength and direction at the sensor's location. This information is then transmitted to the processor, which uses it to construct a detailed, three-dimensional map of the heart's anatomy. This technology is essential for guiding medical procedures such as catheter ablation, where precise navigation within the heart is critical. By providing accurate and real-time positional data, the electromagnetic localization system ensures that at least a catheter 162 can be maneuvered safely and effectively to target areas of abnormal electrical activity, thereby improving the outcomes of the procedure.

With continued reference to FIG. 1, as used in this disclosure, an "ultrasound-based localization system" is a method used to determine the position and movement of objects within the body by employing high-frequency sound waves. The ultrasound-based localization system may involve the use of an ultrasound transducer that emits sound waves, which then reflect off internal structures and are captured by transducer 164 or other sensors. Continuing, the reflected sound waves are processed to create real-time images or data points that represent the location and motion of the tracked object, such as a catheter or other medical instruments. The ultrasound-based localization system may be particularly useful in medical procedures because it provides real-time, non-invasive visualization of internal body structures. The ultrasound-based localization system may allow clinicians to guide instruments accurately within the body, enhancing the precision and safety of procedures like catheter ablation, biopsies, or other interventions. This technology is often integrated with other systems to provide comprehensive spatial and functional mapping of the area being treated. For example, at least a localization system 166 may utilize ultrasound technology, where an array of ultrasound transducers is positioned around the patient. At least a catheter 162, may be fitted with miniature ultrasound receivers, detects the emitted ultrasound waves. At least a localization system 166 may calculate at least a catheter 162 position based on the time it takes for the ultrasound waves to reach the receivers, allowing for precise localization of at least a catheter 162 tip during a procedure.

With continued reference to FIG. 1, as used in this disclosure, "optical localization system" is a method of determining the position and movement of objects using light, typically through the use of cameras and other optical sensors. Optical localization system technology may capture visual data from the tracked object and processes this information to calculate its precise location and trajectory in real-time. In an optical localization system, reflective markers or LED lights may be attached to the object being tracked, such as a catheter tip. Cameras positioned around the area capture the light reflected or emitted by these markers, and software algorithms analyze the captured images to triangulate the exact position of the markers. This data is then transmitted to the processor, which integrates it with other signals to create a comprehensive map of the object's movement within the heart. This method is highly accurate and provides detailed spatial information, making it particularly useful in medical applications where precise positioning is crucial. Optical localization system can be used in conjunction with other localization methods to enhance the overall accuracy and reliability of the electroanatomic mapping system.

With continued reference to FIG. 1, as used in this disclosure, "impedance-based localization system" is a technique used to determine the position of a catheter or other medical device within the body by measuring the electrical impedance between the device and electrodes placed on the patient's body. This method involves passing a small, alternating current through the body and measuring the resulting voltage at different points, allowing the system to calculate the impedance. At least a localization system 166 can then use these impedance measurements to triangulate the exact position of at least a catheter 162 tip within the heart or other body cavities. Impedance varies with the distance and the type of tissue between at least a catheter 162 and the electrodes, enabling precise tracking of the device's location. This technique is particularly useful in electroanatomic mapping and other procedures requiring accurate real-time positioning of medical instruments within the body. In a non-limiting example, position signal 170 may be generated using electromagnetic fields, ultrasound, or other tracking technologies to provide real-time spatial information about at least a at least a catheter 162 position. In a non-limiting example, apparatus 100 may employ other tracking technologies, such as optical localization system or impedance-based localization, to generate position signal 170. Optical localization system uses cameras and reflective markers on at least a catheter 162 to capture its movement and position, while impedance-based localization measures electrical impedance differences between at least a catheter 162 and the body tissues. These methods provide accurate real-time spatial information that processor 102 uses alongside the potential signal 106.

Still referring to FIG. 1, processor 102 may be conditionally configured to receive at least a potential signal 106 from the at least a transducer 164 and the at least a position signal from at least a localization system 166. In a non-limiting example, processor 102 may utilize an electrocardiogram (ECG) transducer to capture electrical signals from the heart, which are indicative of the cardiac cycle. The ECG transducer may detect the electrical potentials generated by the heart's activity and transmits these signals to processor 102. Processor 102 may then analyze the amplitude and frequency of these signals to identify specific heartbeats, allowing for precise timing and coordination with the electroanatomic mapping system. In a non-limiting example, at least a localization system 166 may use a magnetic or electromagnetic field to determine the exact position of a catheter tip within the heart. At least a localization system 166 may generate position signals wherein processor 102 may be configured to receive position signal 170. Continuing, position signal 170 may be used to create a three-dimensional map of the heart's anatomy, showing the real-time position of at least a catheter 162. Without limitation, the position data with potential signal 106 may be combined and processor 102 may map the electrical activity across different regions of the heart, enhancing the accuracy of the electroanatomic mapping. In a non-limiting example, processor 102 may employ advanced algorithms to filter and interpret potential signal 106 received from multiple transducers placed at various points on the patient's body. Continuing, the algorithms may differentiate between true cardiac signals and noise or artifacts, ensuring that only relevant electrical activity is used for mapping. Processor 102 may integrate the filtered data with the positional information from localization system. In a non-limiting example, this integration may allow clinicians to visualize the propagation of electrical impulses through the heart's chambers and identify areas of abnormal conduction.

With continued reference to FIG. 1, without limitation, the predefined threshold of accuracy 160 may be essential to ensure the reliability and validity of the labeled prediction 130 made by the simulation module. For instance, without limitation, the simulation module may be required to achieve an accuracy threshold of 97% in identifying different types of cardiac arrhythmias, such as atrial fibrillation (AFib) or premature ventricular contractions (PVC) before the simulation module will receive the plurality of real time data 156 from the recording device. Continuing, this means that the simulation module must correctly label at least 97% of the cardiac signal segments it processes. Continuing, if the simulation module accuracy falls below this threshold, it may produce incorrect labels, leading to misdiagnosis and inappropriate treatment. Therefore, maintaining a high level of precision is crucial to ensure that the simulation module provides accurate and trustworthy results for use with real time data. In another example, consider a simulation module designed to predict the onset of cardiac events based on real-time ECG data. The predefined threshold of accuracy 160 for this module might be set at 95%, meaning that the module must correctly predict at least 95% of imminent cardiac events, such as heart attacks or arrhythmias, to be considered valid. Continuing, if the simulation module accuracy is below this threshold, it may either fail to predict critical events or generate false alarms, both of which can have serious consequences for patient care.

With continued reference to FIG. 1, apparatus 100 may be configured to receive feedback through graphical user interface 154, wherein the feedback comprises corrections to labeled prediction 130. As used in this disclosure, "feedback" is information provided by a user regarding the accuracy or relevance of a labeled prediction generated by the apparatus, which can be used to refine the system's predictive capabilities. In a non-limiting example, feedback may be provided by a medical professional using apparatus 100 to analyze electrocardiogram data 108. The professional may review labeled prediction 130 that identifies potential anomalies within electrocardiogram data 108 and may notice an incorrect classification of a normal heartbeat as an arrhythmia. Through graphical user interface 154, the medical professional may correct this label by selecting the incorrect prediction and providing the correct classification. This feedback may then be used to update the simulation module 128, which may enhance its ability to differentiate between normal and abnormal heart rhythms in future analyses.

Figure 2:
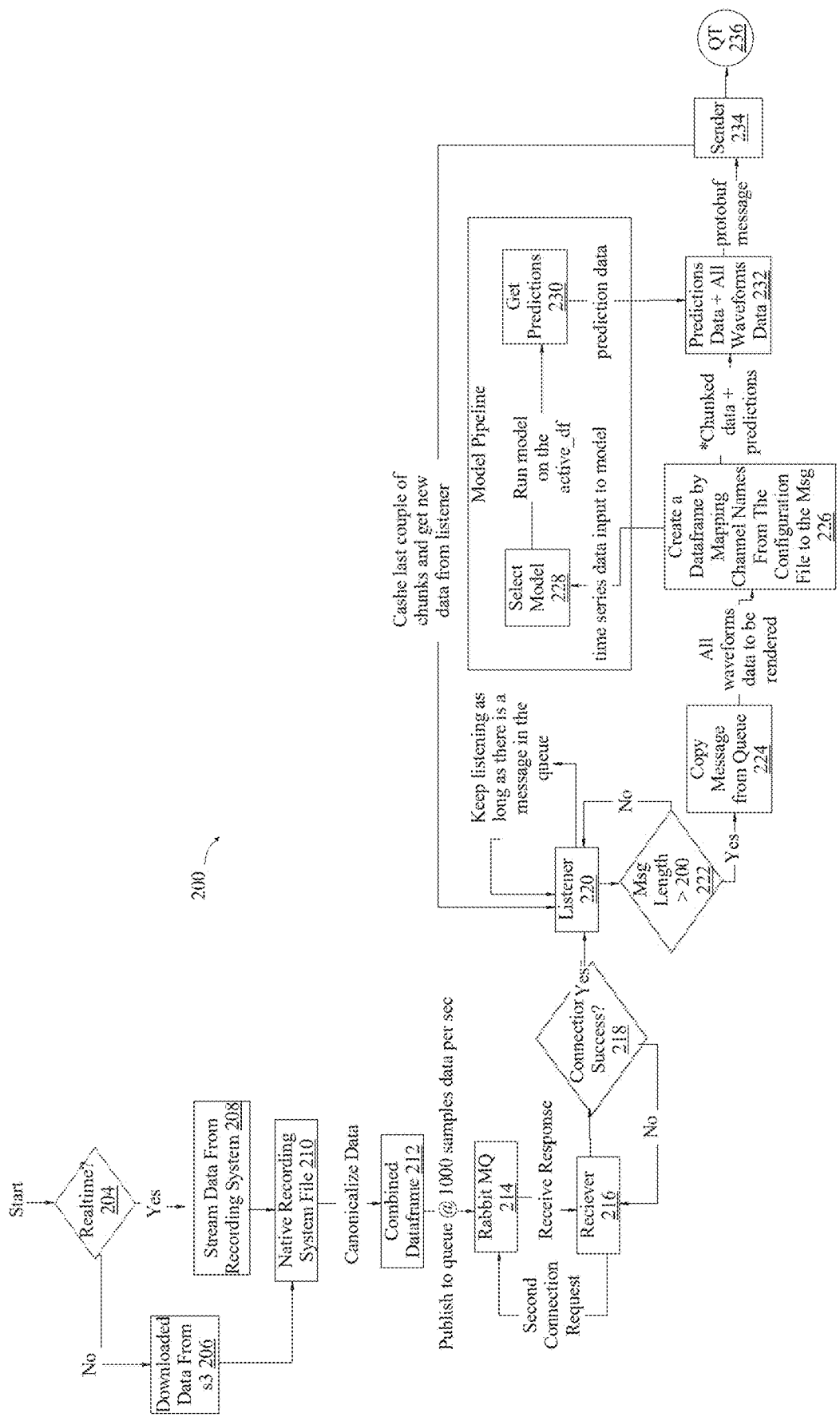
FIG. 2 illustrates a flowchart for implementation of real-time simulation process of a system for real-time labelling of at least a potential signal, in accordance with an example embodiment.

Referring now to FIG. 2, a flowchart for implementation of real-time simulation process of a system for real-time labelling of cardiac signals, in accordance with an example embodiment. With reference to FIG. 2, there is shown a real-time simulation process 200. The real-time simulation process 200 may be performed by a system, or an electronic device such as, but not limited to, a simulation engine, a computing device, a mainframe machine, a server, a computer workstation, a smartphone, a cellular phone, a mobile phone, a gaming device, a consumer electronic (CE) device and/or any other device with simulation capabilities.

As shown in FIG. 2, at 202, the real-time simulation process 200 may be started. The real-time stimulation process 200 may be started based on a reception of a user input to label the cardiac signals. The cardiac signals may refer to the electrical impulses generated by the heart that regulate its rhythmic contractions. Such signals may be crucial for the proper functioning of the heart and are commonly measured and analyzed in clinical settings using techniques such as surface electrocardiography (ECG) or intracardiac electrophysiology studies. There are several types of cardiac signals, each serving a specific purpose in the cardiac conduction system. Examples of different types of cardiac signals may include, but are not limited to, a sinus node signal, an atrial signal, an atrioventricular (AV) node signal, a 'HIS' bundle signal, a bundle branch signal, a ventricular signal, and a repolarization signal.

With continued reference to FIG. 2, at 204, a determination is made whether streaming of real-time data is possible or not. The data may correspond to cardiac signal data that may be associated with a cardiac signal of a patient. In an embodiment, the detected cardiac signal may indicate cardiac abnormalities such as heart attacks, an atrial fibrillation an arrhythmia, a poor blood supply, and a heart inflammation. Further, the intracardiac signal data comprises one or more signal parameters associated with the intracardiac signal.

In an embodiment, a presence of an atrial signal parameter in the data may indicate an electrical activity within the atria of the heart. The atrial signal parameter may be used to diagnose and treat atrial arrhythmias, for example, the atrial fibrillation. A presence of a ventricular signal parameter may indicate an electrical activity within the ventricles of the heart. The ventricles signal parameter may be used to diagnose and treat ventricular arrhythmias, for example, the ventricular fibrillation. A HIS bundle signal parameter may indicate an electrical activity of his bundle region of the heart. The HIS bundle signal parameter may be used to diagnose and treat the bundle branch blocks and for determining the location of AV nodal pathways. The PVP signal parameter may indicate an electrical selectivity of PVPs in the heart. The PVP signal parameter may be used to diagnose and treat the atrial fibrillation.

Similarly, the presence of a bundle of a kent signal parameter may indicate an abnormal electrical connection between the atria and the ventricular to diagnose and treat the Wolff-Parkinson-White syndrome. The accessory pathway signals may indicate a location of accessory pathways. The catheter signal parameter may indicate a catheter location within the heart, aiding in the treatment of the atrial filtration. The fragmented signal parameter may indicate areas of slow conduction within the heart.

With continued reference to FIG. 2, in case the real-time data streaming is not possible, then at 206, the data may be downloaded from a storage system (such as Amazon Web Services cloud-S3). If the real-time streaming is possible, then at 208, the data may be streamed from a recording system. The recording system may be configured to capture real-time data associated with the cardiac signals of the patient.

With continued reference to FIG. 2, at 210, native recording system files may be obtained. The native recording system files may include the desired data associated with the cardiac signals. At, 212, the data may be canonicalized (or standardized) to combine a data frame. At 214, a message broker (such as rabbit MQ) may store the combined data frame.

With continued reference to FIG. 2, at 216, a receiver may generate a connection request to a listener based on a response received from the message broker. At 218, a determination is whether a connection between the listener and the receiver is established or not. If the connection is not established, the receiver generates another connection request to the listener. Further, at 220, the listener may keep listening as long as there is a message in the queue. Further, at 222, a determination is made whether a message length is greater than a predetermined length, for example, 202 bytes. If the message length is not greater than the predetermined length, then the message may be sent to the listener. However, if the message length is greater than the predetermined length, then at 224, the message may be copied from the queue. At 226, a data frame may be created by mapping channel names from the configuration file to the message. At 228, time series data is inputted to a selected machine learning (ML) model. At 230, the selected ML model is processed on the "active_df" to generate prediction data. At 232, based on the prediction data, each waveform data, chunked data, and the predictions for labelling the cardiac signals may be generated. Further, at 234, the sender may receive the chunked data and the predictions. At 236, QT may be configured to receive a protobuf message from the sender.

With continued reference to FIG. 2, a script for real-time simulation is also described. The script that reads data from a file and sends it over a network connection may be written in any programming language (say Python) and may use the STOMP (Streaming Text Oriented Messaging Protocol) for data transmission and retrieval.

Specifically, the script may define a function send_ept (ept_row, conn) that intakes a row of data (ept_row) and a connection object (conn) as parameters. This function sends the data to two different destinations (config.ep_destination and config.ecg_egm_queue) using the provided connection.

The main function of the script may initialize a counter (count) and print a message indicating that it is starting to read data. It establishes a connection (conn) to the message broker with the provided configuration parameters using a stomp library. Another connection (conn_default) may be established to a default host and port.

The script then reads data from a file specified in the configuration (config.ep_data_path), the first row of data is extracted, processed, and sent to the specified destinations using the send_ept function.

A loop is started that continuously sends subsequent rows of data at a rate of approximately one per millisecond. The loop prints a message for every 1000 rows sent. The code defines two functions: 'pre_processing' and 'channel_mapping_extraction'. These functions are designed to perform data pre-processing tasks.

The 'pre_processing' function performs pre-processing on the data. It takes the path to a data file as input and returns the path to the pre-processed data file. It reads the data file as a Pandas DataFrame, assuming that the data is space-separated. It removes any columns (axis=1) that contain all NaN (Not-a-Number) values. It checks if a pre-processed file already exists with a naming convention that includes "_canonical". If such a file exists, it returns its path. Otherwise, it proceeds with data pre-processing. It further constructs the path for the pre-processed file by appending "_canonical" to the filename part of the input path. If the pre-processed file does not exist, it performs the following step(s).

It extracts channel mapping information from the associated "configuration" file by calling the 'channel_mapping_extraction' function. Further, it creates a list called 'channel_mapping_list' that may be a list of channel numbers (presumably as integers). It subtracts one (1) from each element in 'channel_mapping_list' to adjust for zero-based indexing. It updates the column names of the DataFrame with the adjusted channel numbers. It creates a new DataFrame and updates the values in 'df' with the rounded values from the original DataFrame. It saves the pre-processed data as a text file with the constructed filename and returns the path to the pre-processed data file.

The "channel_mapping_extraction (inf_file)" function takes the path to a 'configuration' file as an input, which is typically associated with the data file. It aims to extract information about the channel mapping from the "configuration" file. It finds the line number where the text "Channel Number" is located in the "configuration" file. This line is used as a reference point for extracting channel information. It opens the "configuration" file, reads its content, and stores it in the 'lines' list after skipping the header rows based on the line number obtained earlier. It then calls another function, 'find_channel_details', passing a DataFrame created from the 'lines' as input. This function is expected to extract channel details. The channel details are stored in a list called 'list_of_channels'. Finally, the function constructs a dictionary called 'channel_mapping' where keys are channel numbers and values are associated details and returns the 'channel_mapping' dictionary.

With continued reference to FIG. 2, for streaming and prediction a set of steps may be performed. A first step of the set of steps may correspond to a 'Configuration and Setup' step. In the 'Configuration and Setup', logging may be configured to log messages to a file ('app_waveforms.log'). ActiveMQ connections may be established for both sending and receiving data. Temporary directories for logs may be created. The script may further set up a configuration dictionary (config) to store various settings and parameters.

A second step of the set of steps may correspond to a 'Data Buffering' step. In the 'Data Buffering' step, the script may subscribe to an ActiveMQ queue to receive cardiac signals (or cardiac waveform data). The received data may be stored in a list called messages (presumably containing timestamps and corresponding values).

A third step of the set of steps may correspond to a 'Model Initialization' step. In the 'Model Initialization' step, the script initializes a model based on the specified configuration. The chosen model may be loaded, and the script enters a loop for continuous data processing.

A fourth step of the set of steps may correspond to a 'Threshold check' step. In the 'Threshold check' step, the script checks if the length of the messages list is greater than a predefined threshold (configurable as config["ep_samples"] or 202).

A fifth step of the set of steps may correspond to a 'Data Preparation and Model Prediction' step. In the 'Data Preparation and Model Prediction' step, the received data may be prepared using a utility function. Additional columns may be created as needed, and the data may be structured appropriately. Model prediction may be performed using the initialized model, and the result may be stored in prediction_data.

A sixth step of the set of steps may correspond to a 'Sliding Window Iteration' step. In the 'Sliding Window Iteration' step, the number of data points to process in each iteration may be determined, considering non-overlapping segments. The iteration through the data may be done using a sliding window and a non-overlapping portion of the prediction_data may be extracted.

A seventh step of the set of steps may correspond to a 'Prediction Caching for Overlapping' step. In the 'Prediction Caching for Overlapping' step, the overlapping part of the prediction_data (e.g., the last config["overlapping_window"] data points) may be cached for the next iteration.

An eighth step of the set of steps may correspond to a 'Combining Predictions with OR Gate' step. In the 'Combining Predictions with OR Gate' step, an "OR gate" (i.e. a logical OR operation) may be used to combine predictions from the previous and current iterations. The predictions that may be cached from the previous iteration (if there are any) may be used. If the previous iteration is not available, the current iteration's predictions may be applied. It may be noted that every lead may be treated separately using this reasoning.

A ninth step of the set of steps may correspond to a 'Saving Predictions to File' step. In the 'Saving Predictions to File' step, if a file for saving predictions already exists, the new predictions may be appended to that file. If the file does not exist, a new file may be created to save the predictions. This step may be optional.

A tenth step of the set of steps may correspond to a 'Labeling and Packaging' step. In the 'Labeling and Packaging' step, the predicted data may be segmented into subsequences based on certain conditions, and labels may be assigned. The labeled data may be stored in a pandas DataFrame. A Protocol Buffers message (model_data) may be created to package the processed waveform data, labels, and other relevant information.

An eleventh step of the set of steps may correspond to a 'Data Publishing' step. In the 'Data Publishing' step, the packaged data may be converted to a base64-encoded string. Depending on the configuration (config["save_ecg_egm_protobuf_zip_file"]), the string may be either saved to a protobuf file or sent to a specified message queue (config["output_queue"]) for further processing or consumption.

A twelfth step of the set of steps may correspond to an 'Error Handling and Health Checks' step. In the 'Error Handling and Health Checks' step, the script includes error handling mechanisms to manage cases where no waveform data is received. It incorporates health checks, and if an error counter is reached, it sends a status message and resets the counter.

A thirteenth step of the set of steps may correspond to an 'Infinite Loop' step. In the 'Infinite Loop' step, the main loop continues to process incoming data in real-time.

Figure 3:
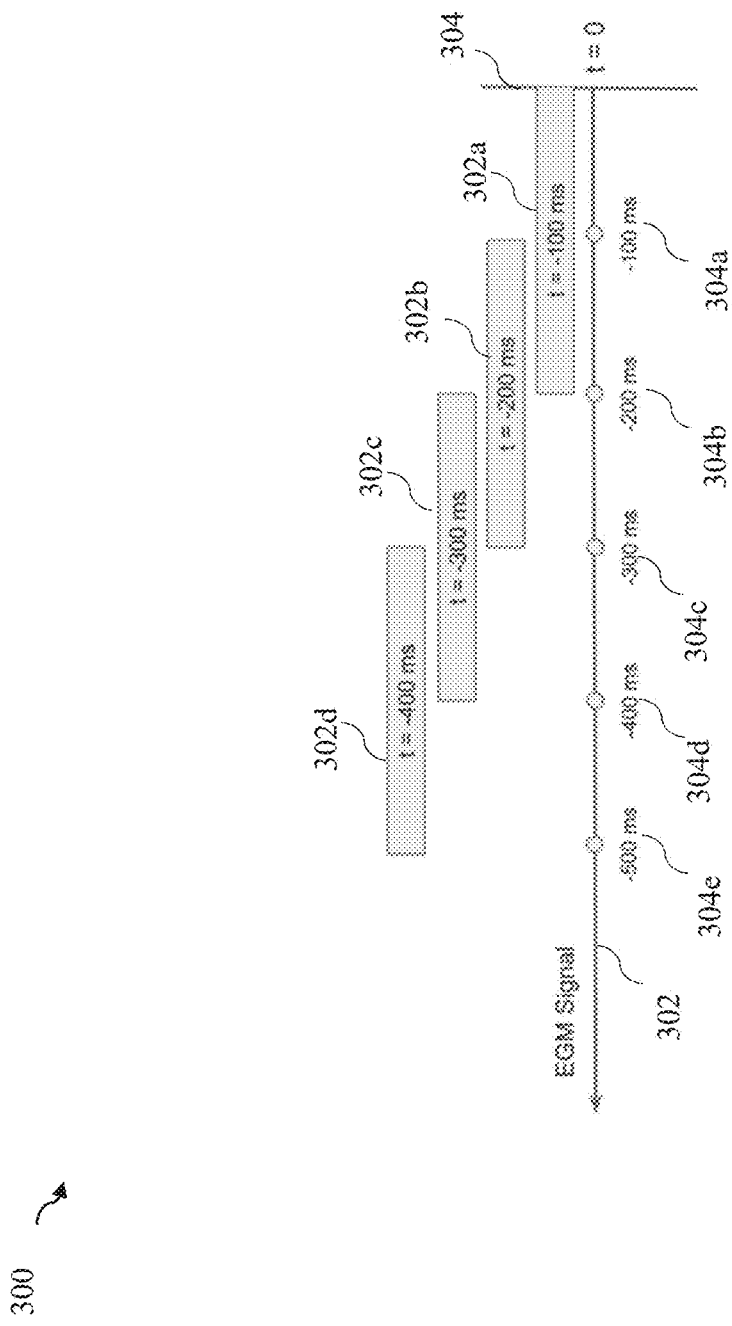
FIG. 3 is a graph illustrating a real-time signal segmentation of a cardiac signal, in accordance with an example embodiment.

Referring now to FIG. 3, a graph 300 illustrating a real time cardiac signal segmentation, in accordance with an example embodiment. As shown by FIG. 3, an EGM signal 302 is segmented at a plurality of time periods 304 to generate a plurality of EGM segments. As used in this disclosure, an "EGM signal" is an electrogram signal which is a recording of electrical activity from within the heart. Without limitation, the EGM signal may be captured using electrodes placed directly on the heart tissue. In a non-limiting example, the EGM signal 302 is segmented at a time period 304a to generate an EGM segment 302a. The EGM signal 302 is segmented at a time period 304b to generate an EGM segment 302b. The EGM signal 302 is segmented at a time period 304c to generate an EGM segment 302c. The EGM signal 302 is segmented at a time period 304d to generate an EGM segment 302d. The EGM signal 302 is segmented at a time period 304e.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 4:
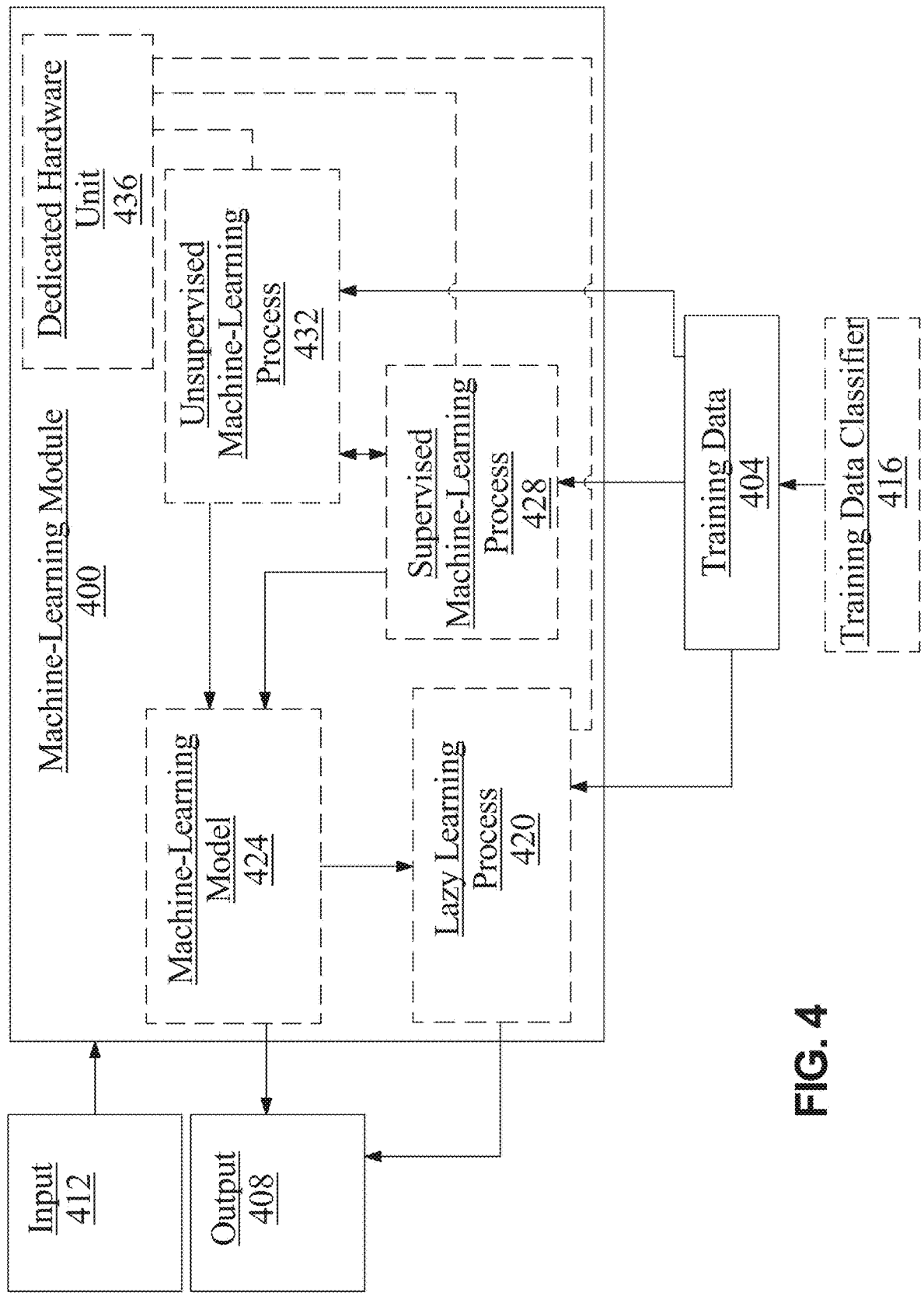
FIG. 4 is a block diagram of an exemplary machine-learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative inputs such as canonicalized data and output labeled predictions.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to categories of segment labels.

Still referring to FIG. 4, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B) = P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 116. Processor may interpolate the low pixel count image to convert the 100 pixels into 116 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 116. Processor may down-sample the high pixel count image to convert the 256 pixels into 116 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include canonicalized data as described above as inputs, labeled prediction as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
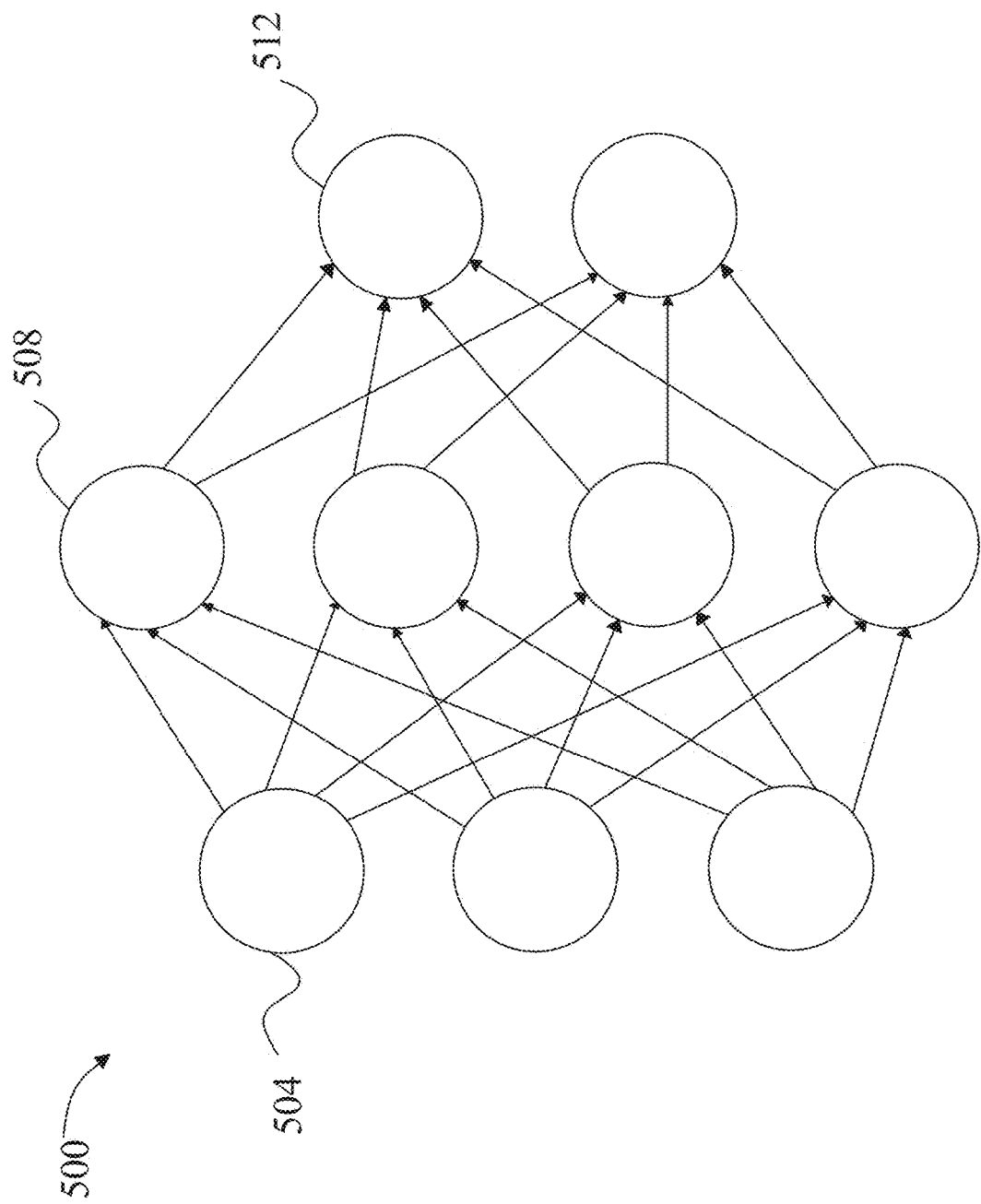
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
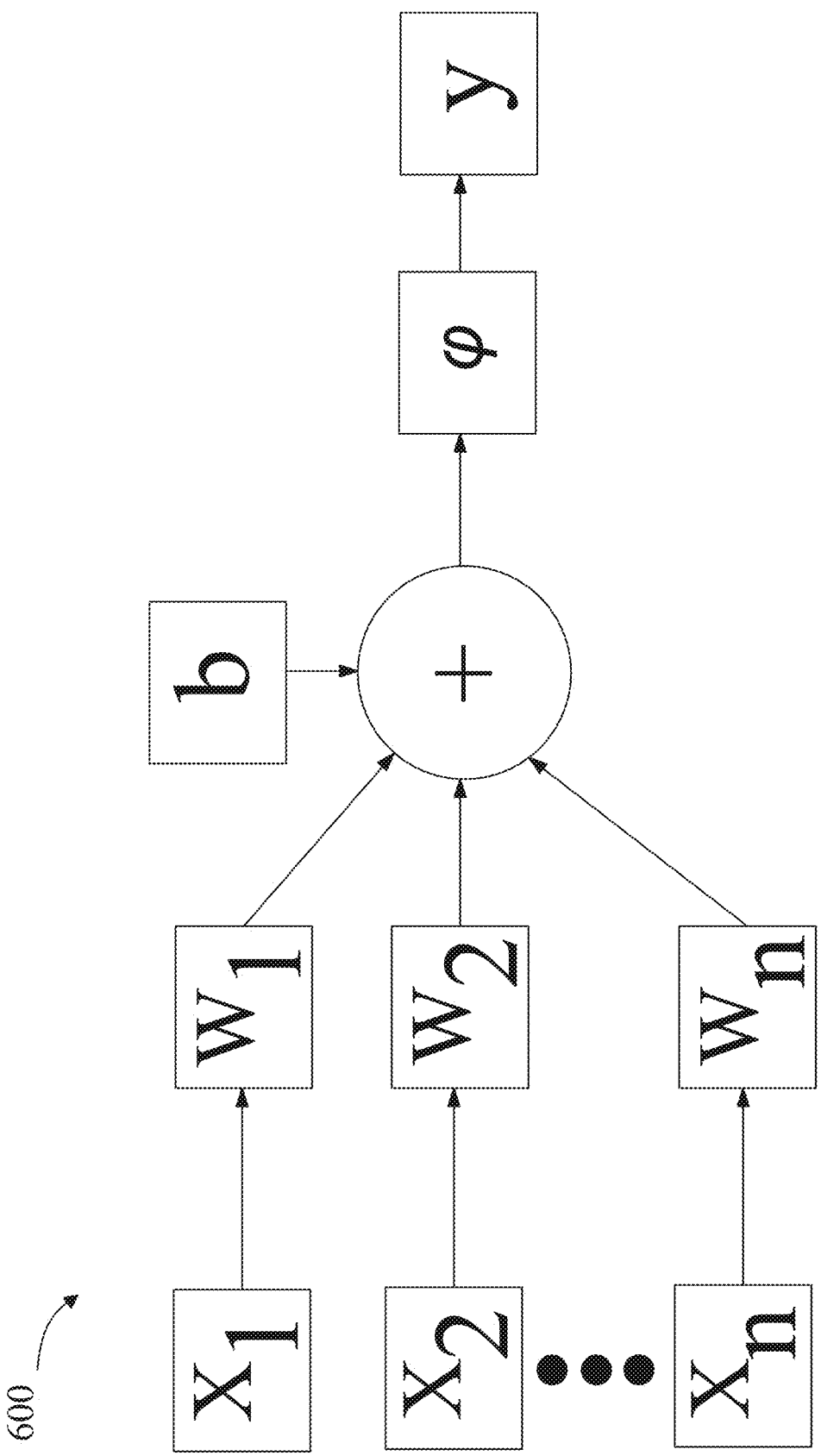
FIG. 6 is a diagram of an exemplary embodiment of a node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
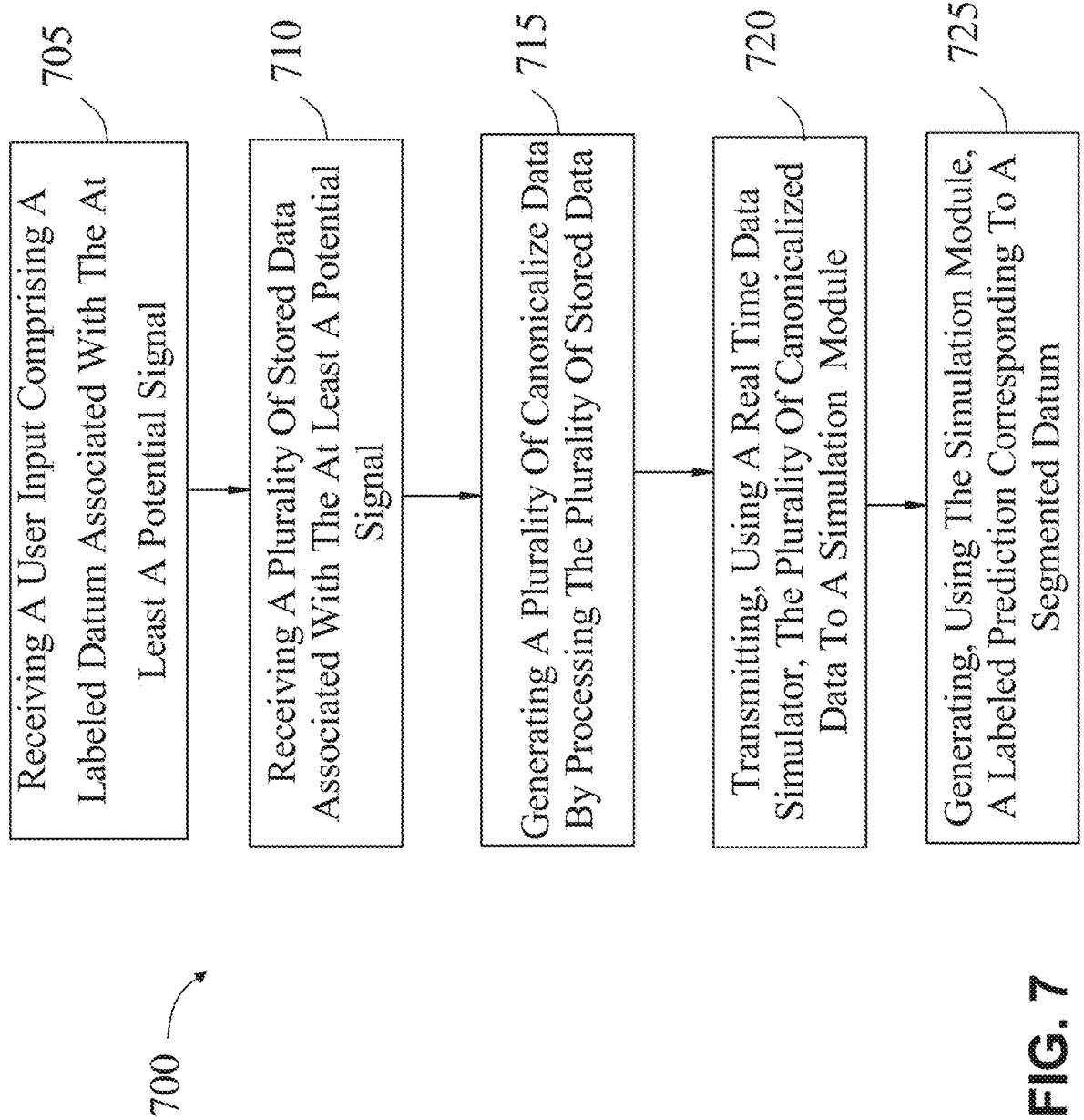
FIG. 7 is a block diagram of an exemplary method for determining a label dynamically for a potential signal.

Referring now to FIG. 7, a flow diagram of an exemplary method 700 for determining a label dynamically using a potential signal is illustrated. At step 705, method 700 includes receiving a user input comprising a labeled datum associated with the at least a potential signal. This may be implemented as described and with reference to FIGS. 1-6.

Still referring to FIG. 7, at step 710, method 700 receiving, using at least a processor, a plurality of stored data associated with the at least a potential signal. This may be implemented as described and with reference to FIGS. 1-6.

Still referring to FIG. 7, at step 715, method 700 includes generating, using the at least a processor, a plurality of canonicalized data by processing the plurality of stored data. This may be implemented as described and with reference to FIGS. 1-6.

Still referring to FIG. 7, at step 720, method 700 includes transmitting, using a real time data simulator, the plurality of canonicalized data to a simulation module. This may be implemented as described and with reference to FIGS. 1-6.

Still referring to FIG. 7, at step 725, method 700 includes generating, using the simulation module, a labeled prediction corresponding to a segmented datum, wherein generating the labeled prediction comprises receiving the plurality of canonicalized data from the real time data simulator, segmenting the plurality of canonicalized data, predicting a labeled prediction for each of the segmented datums; and generating a labeled prediction corresponding to the segmented datum. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
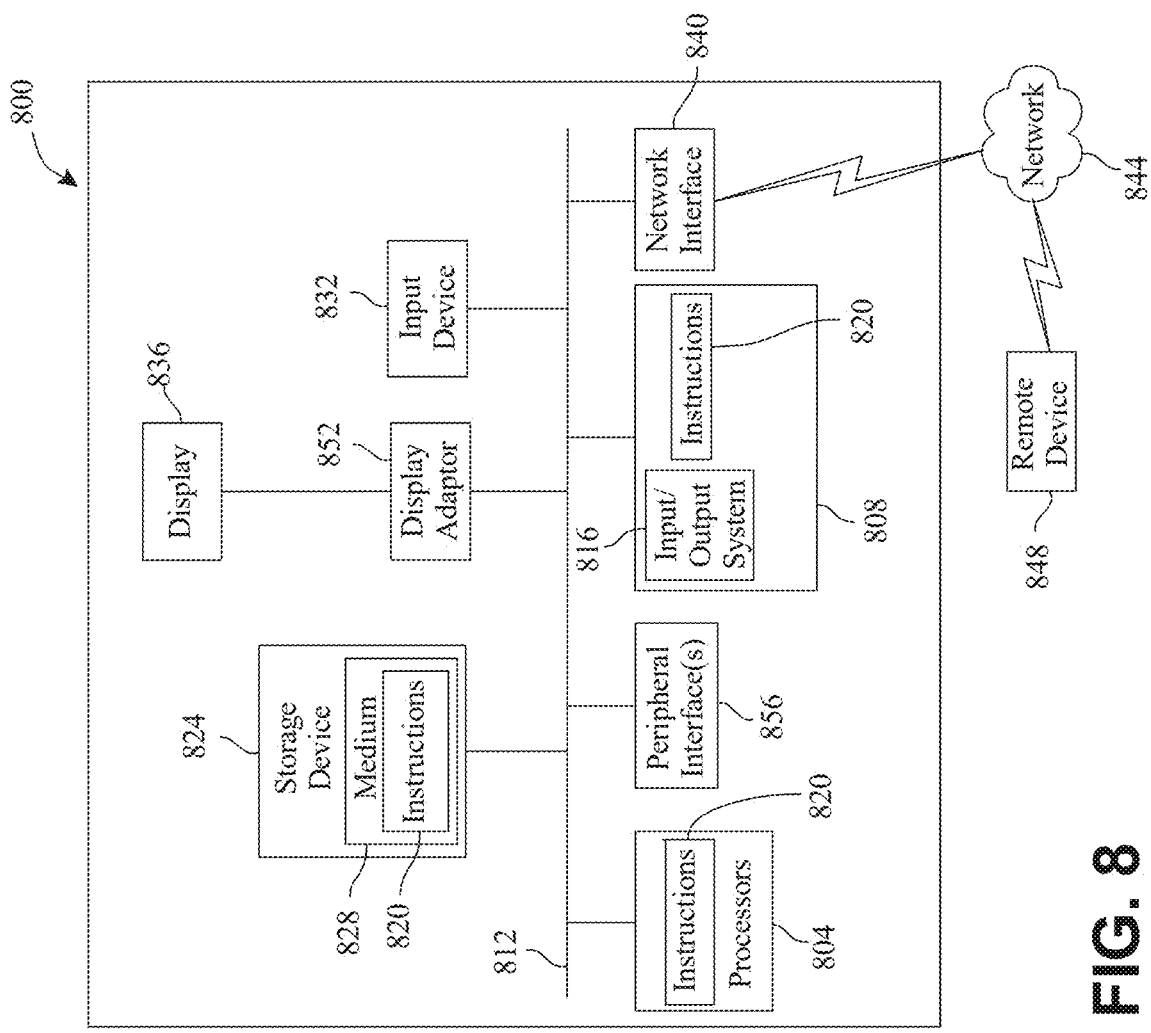
FIG. 8 is a block diagram of a computing system that can be used to implement any one or more of the methodologies disclosed herein and any one or more portions thereof.

FIG. 8 shows a diagrammatic representation of one embodiment of computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining a label dynamically using a potential signal, wherein the apparatus comprises:
    a catheter which includes a transducer configured to detect at least a cardiac phenomenon and output the at least a potential signal as a function of the cardiac phenomenon;
    a memory; and
    at least a processor communicatively connected to the memory, wherein the memory contains instructions configuring the at least a processor to:
    receive a user input comprising a labeled datum associated with the at least a potential signal of one or both of electrocardiogram (ECG) signal and electrogram (EGM) signal;
    receive a plurality of stored data associated with the at least a potential signal;
    generate, using the at least a processor, a plurality of canonicalized data by processing the plurality of stored data;
    transmit, using a real time data simulator, the plurality of canonicalized data to a simulation module, wherein the simulation module has been trained using a plurality of labeled training data comprising a signal segment corresponding to a segment label;
    wherein the simulation module comprises:
    a segmentation model comprising a convolutional neural network and configured to generate a plurality of segmented data as a function of the plurality of canonicalized data and at least a temporal datum;
    generate, using the simulation module, a labeled prediction corresponding to a segmented datum of the plurality of segmented data, wherein generating the labeled prediction comprises:
    receiving the plurality of canonicalized data from the real time data simulator;
    segmenting the plurality of canonicalized data;
    predicting a labeled prediction for each of the plurality of canonicalized data;
    generating a labeled prediction corresponding to a segmented datum; and
    display the labeled prediction through a graphical user interface.

2. The apparatus of claim 1, wherein the at least a potential signal comprises ECG data.

3. The apparatus of claim 1, wherein the simulation module is configured to conditionally receive a plurality of real time data from a recording device when the simulation module meets a predefined threshold of accuracy.

4. The apparatus of claim 1, wherein the plurality of stored data comprises at least a potential signal associated with at least a position signal.

5. The apparatus of claim 1, wherein generating the plurality of canonicalized data comprises:
    normalizing the plurality of stored data into a consistent data format; and
    validating the plurality of stored data against a predefined protocol.

6. The apparatus of claim 1, wherein the simulation module further comprises a prediction model comprising a recurrent neural network, and the prediction model is configured to generate a labeled prediction corresponding to each of the plurality of segmented data.

7. The apparatus of claim 1, further configured to receive feedback through a graphical user interface, the feedback comprising corrections to the labeled prediction.

8. A method for determining a label dynamically using a potential signal, wherein the method comprises:
    using a catheter which includes a transducer configured to detect at least a cardiac phenomenon and outputting the at least a potential signal as a function of the cardiac phenomenon;
    receiving, using at least a processor, a user input comprising a labeled datum associated with the at least a potential signal of one or both of electrocardiogram (ECG) signal and electrogram (EGM) signal;

receiving, using the at least a processor, a plurality of stored data associated with the at least a potential signal;

generating, using the at least a processor, a plurality of canonicalized data by processing the plurality of stored data;

transmitting, using a real time data simulator, the plurality of canonicalized data to a simulation module, wherein the simulation module has been trained using a plurality of labeled training data comprising a signal segment corresponding to a segment label;

wherein the simulation module comprises:

a segmentation model comprising a convolutional neural network and configured to generate a plurality of segmented data as a function of the plurality of canonicalized data and at least a temporal datum;

generating, using the simulation module, a labeled prediction corresponding to a segmented datum of the plurality of segmented data, wherein generating the labeled prediction comprises:

receiving the plurality of canonicalized data from the real time data simulator;

segmenting the plurality of canonicalized data;

predicting a labeled prediction for each of the segmented datums;

generating a labeled prediction corresponding to the segmented datum; and displaying, using a graphical user interface, the labeled prediction.

9. The method of claim 8, wherein the at least a potential signal comprises electrocardiogram ECG data.

10. The method of claim 8, further comprising conditionally receiving, using wherein the simulation module, is configured to conditionally receive a plurality of real time data from a recording device when the simulation module meets a predefined threshold of accuracy.

11. The method of claim 8, wherein the plurality of stored data comprises at least a potential signal associated with at least a position signal.

12. The method of claim 8, wherein generating the plurality of canonicalized data comprises:

normalizing the plurality of stored data into a consistent data format; and validating the plurality of stored data against a predefined protocol.

13. The method of claim 8, wherein the simulation module further comprises a prediction model comprising a recurrent neural network, and the method further comprises generating, using the prediction model, is configured to generate a labeled prediction corresponding to each plurality of segmented data.

14. The method of claim 8, further configured to comprising receiving feedback through a graphical user interface, the feedback comprising corrections to the labeled prediction.

* * * * *